Patented Nov. 10, 1953

2,658,832

UNITED STATES PATENT OFFICE 2,658,832

DENTAL CEMENT

Jack De Ment, Portland, Oreg.

No Drawing. Application July 25, 1950,
Serial No. 176,915

2 Claims. (Cl. 106—35)

This invention relates to improved dental cements, in particular to cold-setting cements for dental restoration and prosthetic work.

The present improvement is related to my previous invention, entitled "Artifical Tooth Composition," U. S. 2,508,816, granted May 23, 1950, and especially to "Dental Cement," U. S. 2,549,180.

Among the objects of the present invention are the following:

(a) To provide the dental prosthesis and restoration art with an improved cold-setting cement which more closely simulates the appearance of the natural tooth.

(b) To provide the dental art with an improved cement which, in view of its composition and structure, is better tolerated by the tissues comprising the tooth organ.

Other objects of this invention are set out subsequently.

Briefly, the present invention involves compositions which comprise hydroxyapatites, described subsequently, compounded with suitable material, which compositions, after compounding, harden from a plastic mass to an implastic body of various characteristics.

The hydroxyapatites I employ have the following general formula

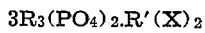

wherein R and R' are usually the same element, a divalent cation, as for example, Zn, Ca and/or Pb; and X is usually OH, but may also be or include a halogen element, sulfate or carbonate.

I prefer to prepare the hydroxyapatites in the following manner: stoichiometrically equivalent solutions of a suitable divalent salt, e. g., supra, and alkali dihydrogen phosphate (e. g., $KH_2PO_4$) are added in small amounts, followed by sufficient alkali hydroxide (e. g., NaOH), to a large bulk of boiling water; the sodium hydroxide must be added to keep the system neutral to such indicators as methyl red. Time is allowed after each addition for the reaction to go to completion.

The hydroxyapatite precipitates from the solution as fine light colored crystals, the reaction being for example

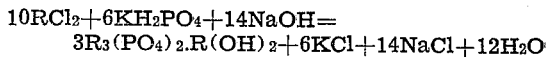

The hydroxyapatite so prepared is removed by filtration and thoroughly washed and dried. Care must be taken to prevent the reaction from proceeding in other directions, and the color of the indicator must be closely watched.

The hydroxyapatite may be employed in an uncalcined form; or, when calcined, as desired. The calcining may range between approximately 400 deg. C. and 900 deg. C., temperatures of greater than 1000 to 1100 deg. C. being avoided, at least for long periods, as at these temperatures the compound begins to undergo decomposition. The calcining period may range between one-quarter of an hour and several hours.

The hydroxyapatite powders may be employed coarse or fine, in common with the requirements of the art, and for most applications a fineness of at least 100 mesh is desirable, with several hundred or more mesh fineness preferred. The fineness of the hydroxyapatite powders is of course not limiting as various finenesses will be of value in different applications of the present invention, as for example in liners and cement to metal bonds.

The hydroxyapatite powders are admixed, say on a porcelain plate, with a suitable hardening liquid. As hardening liquids I prefer certain soluble zinc salts, zinc chloride being the best for general utility, though including for example the nitrate, bromide, and fluoride, the latter two compounds being of value in specific or special applications, as well as solutions of phosphoric acid.

The zinc chloride solution may range between say about 20 per cent (S. G. 1.18) and 70 per cent (S. G. 1.96) or saturation, values near the latter being preferred. The phosphoric acid solution may range between approximately 60 per cent (S. G. 1.42) and 96 per cent (S. G. 1.82), pure phosphoric acid not being excluded, values near the latter being preferred. In addition, the phosphoric acid solution may carry 4 to 6 per cent of alumina and up to 3 per cent of $Na_2O$, or, both of these ingredients may be replaced by magnesia, as desired.

The cement, just prior to use, is made by spatulating on say a porcelain plate the hydroxyapatite powder and the hardening liquid. The quantities of the hydroxyapatite and liquid will vary according to the consistency desired, i. e., the relative thickness or thinness of the paste, and this will depend upon the operator's judgement and the circumstance. In general, a suitable paste is obtained by blending approximately one part of hardening liquid to two to four parts of hydroxyapatite powder.

Depending upon the choice of the hydroxyapatite, and the hardening liquid, the plastic mass hardens to a white body that compares favorably with cold-setting cements now available in the art and at the same time, being of composition and physical structure more nearly like the hard tissue of the tooth organ, be kinder (better tolerated). The change from a plastic to an implastic state may vary as to time, ranging from several minutes to hours or days, again depending upon the choice of materials. Also, the degree and character of the final product will vary according to the materials.

The following are examples of results obtained:

*Zinc hydroxyapatite.*—Uncalcined zinc hydroxyapatite, admixed with aqueous zinc chloride solution (half-saturated to saturated) sets up within a few minutes to a good, hard mass that lacks friability, exhibits moderate edge strength, and is white in color. With phosphoric acid solution (e. g., 85 per cent) the hardening is slower and the product is not as durable.

Calcined (e. g., 1 hour at about 500 to 800 deg. C.) zinc hydroxyapatite admixed into a paste of light consistency hardens within a few minutes and remains durable for several months. Calcining treatment of zinc hydroxyapatite causes a pale yellow color to appear when the temperature and treatment time is large. With phosphoric acid, the calcined zinc hydroxyapatite hardens very quickly, but the mass exhibits friability.

Zinc hydroxyapatite cement prepared with zinc solution exhibits a good bonding to metal.

*Calcium hydroxyapatite.*—With phosphoric acid uncalcined calcium hydroxyapatite sets very slowly, over a period of days, to a mass that exhibits plasticity; with solutions of zinc salts the setting is evident but slight, and when calcined calcium hydroxyapatite is employed the product is friable. With phosphoric acid a fast setting is observed, with some plasticity remaining for a period of several days or more, providing however a good metal bonding property.

*Lead hydroxyapatite.*—Uncalcined lead hydroxyapatite sets with saturated zinc chloride solution, but the product is not as strong as the zinc hydroxyapatite cement. With phosphoric acid a friable mass is obtained. Calcined lead hydroxyapatite, with both of these hardening liquids gives a hard but crumbly product, this latter characteristic remaining after two weeks.

Strontium hydroxyapatite, with zinc chloride solution, yields a mass which is friable.

As desired, and at the option of the user, the presently disclosed dental cements may be tinted by agents known in the art, as for example, cadmium red, synthetic dyestuffs, and iron oxide, as well as by fluorescent additives (e. g., as visible light responsive phosphors or luminescent organic compounds). Moreover, traces of sodium fluoride (as when zinc fluoride is not employed in the hardening liquid, supra) may be added, in accordance with the accepted practices of dental sciences, for anti-caries therapy (e. g., in children). The present hydroxyapatite dental cements are generally compatible when employed in combination with zinc oxide, zinc phosphate, zinc oxyphosphate, and like cements of the art.

From the disclosure, supra, it is noted that the product may exhibit a variety of strength characteristics, from a tough, hard body, as in the case of zinc hydroxyapatite cements, to a friable body, as in the case of calcium hydroxyapatite cements. The utilities of these products will depend upon the nature of the dental problem, the bents of the operator and like factors. Thus, the zinc hydroxyapatite cements are anticipated as of more general value, say for permanent fillings and restoration work. Not excluded, however, are the friable compositions, supra, which are known in the art to be of value in problems involving deep cavities, for pulp treatment or exposure as well as for pulpectomies. The friable cements are placed over the pulp horn or in near exposure areas, and may be left in as temporary fillings, enabling a later decision as to whether a permanent filling is in order.

I claim:

1. As a new composition for dental prosthesis a cold-setting cement which consists of the implastic reaction product formed in the blending of approximately two to four parts of zinc hydroxyapatite having the formula $$3Zn_3(PO_4)_2 \cdot Zn(OH)_2$$

and approximately one part of an aqueous hardening liquid containing between approximately 20 and 70 per cent of solute dissolved in water, said solute being selected from the group of substances consisting of Zn chloride, fluoride and bromide.

2. As a new composition for dental prosthesis a cold-setting cement which consists of the implastic reaction product formed in the blending of approximately two to four parts of calcined zinc hydroxyapatite having the formula $$3Zn_3(PO_4)_2 \cdot Zn(OH)_2$$

and approximately one part of aqueous hardening liquid containing between approximately 20 and 70 per cent of solute dissolved in water, said solute being selected from the group of substances consisting of Zn chloride, fluoride and bromide.

JACK DE MENT.

References Cited in the file of this patent

UNITED STATES PATENTS

| Number | Name | Date |
|---|---|---|
| 2,549,180 | De Ment | Apr. 17, 1951 |

FOREIGN PATENTS

| Number | Country | Date |
|---|---|---|
| 15,181 | Great Britain | 1904 |

OTHER REFERENCES

Transactions American Institute of Chemical Engineering, vol. XIX, pages 20–22, 1927.